US007627306B2

(12) United States Patent
Small et al.

(10) Patent No.: US 7,627,306 B2
(45) Date of Patent: Dec. 1, 2009

(54) METHOD AND APPARATUS FOR MAINTAINING NETWORK PERFORMANCE IN A COMMUNICATION SYSTEM

(75) Inventors: David Small, Dublin, CA (US); Canhui Ou, Danville, CA (US); Jonathan H. Roll, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 651 days.

(21) Appl. No.: 11/427,142

(22) Filed: Jun. 28, 2006

(65) Prior Publication Data

US 2008/0003974 A1     Jan. 3, 2008

(51) Int. Cl.
H04M 11/00 (2006.01)
H04W 40/00 (2006.01)
H04B 1/38 (2006.01)
(52) U.S. Cl. .................. 455/403; 455/445; 455/560
(58) Field of Classification Search ........... 455/403, 455/445, 560
See application file for complete search history.

(56) References Cited

U.S. PATENT DOCUMENTS 5,722,074 A * 2/1998 Muszynski .............. 455/442
2001/0036172 A1 * 11/2001 Haskal .................... 370/352
2002/0131434 A1 * 9/2002 Vukovic et al. ........... 370/411
2005/0265251 A1 * 12/2005 Acharya et al. ........... 370/252
2005/0286425 A1 * 12/2005 Nagesh et al. ............ 370/238
2006/0067235 A1 * 3/2006 Acharya et al. ........... 370/238

* cited by examiner

Primary Examiner—Lester Kincaid
Assistant Examiner—Nathan Mitchell
(74) Attorney, Agent, or Firm—Ed Guntin; Andrew C. Gust; Akerman Senterfitt

(57) ABSTRACT

A method and apparatus is disclosed for method and apparatus for maintaining network performance in a communication system. A system that incorporates teachings of the present disclosure may include, for example, a network management system (NMS) that manages operations of a communication system including a mobile telephone switching office (MTSO) coupled to a plurality of wireless base terminals (WBTs) by way of a corresponding plurality of network elements, having a network configuration element that identifies for each of the plurality of WBTs a plurality of resultant communication paths to the MTSO according to a plurality of differential delays calculated from alternative communication paths connecting combinations of the WBTs to the MTSO for each of a plurality of change scenarios affecting the plurality of network elements. Additional embodiments are disclosed.

19 Claims, 4 Drawing Sheets

200

METHOD AND APPARATUS FOR MAINTAINING NETWORK PERFORMANCE IN A COMMUNICATION SYSTEM

RELATED APPLICATION

U.S. patent application Ser. No. 11/427,142 filed Jun. 28, 2006, by Small et al., entitled "Method and Apparatus for Improving Network Performance in a Communication System," incorporated herein by reference in its entirety.

FIELD OF THE DISCLOSURE

The present disclosure relates generally to communication systems, and more specifically to a method and apparatus for maintaining network performance in a communication system.

BACKGROUND

In a cellular system, wireless base terminals (WBTs) cover a wide geographic area utilizing frequency-reuse techniques. It is not uncommon for WBTs to have overlapping coverage areas to avoid null or dead spots that can cause dropped calls. In overlapping coverage areas it is possible for a mobile phone to submit a mobile origination call to a mobile telephone switching office (MTSO) by way of two or more WBTs.

In order for the MTSO to operate properly, mobile phone operators expect signals received by the MTSO to not exceed for example a maximum latency and maximum jitter. Furthermore, signals from multiple WBTs must arrive at the MTSO within a set time period in order to be identified as part of the same call stream. This time period is known as differential delay. Current mobile telephony backhaul networks are served by circuit-switched elements (e.g., T1 lines), which have very short delay since bits are transmitted at nearly the speed of light.

As telephone companies seek to reduce cost, increase features, and increase reliability, alternative backhaul technologies are being considered: Ethernet over Copper, Ethernet over Fiber, WiMAX, SONET, NG-SONET, and so on. With the growth of packet-switched (vs. circuit-switched) multi-hop backhaul, and the variability in packet delivery times, differential delay can become a significant problem for legacy MTSOs receiving WBT signals over packet-switched networks. This can be especially problematic when the packet-switched network experiences a network fault at one or more network elements carrying said messages to the MTSO.

A need therefore arises for a method and apparatus for maintaining network performance in a communication system.

DETAILED DESCRIPTION

Embodiments in accordance with the present disclosure provide a method and apparatus for maintaining network performance in a communication system.

In a first embodiment of the present disclosure, a network management system (NMS) that manages operations of a communication system including a mobile telephone switching office (MTSO) coupled to a plurality of wireless base terminals (WBTs) by way of a corresponding plurality of network elements, can have a network configuration element that identifies for each of the plurality of WBTs a plurality of resultant communication paths to the MTSO according to a plurality of differential delays calculated from alternative communication paths connecting combinations of the WBTs to the MTSO for each of a plurality of change scenarios affecting the plurality of network elements.

In a second embodiment of the present disclosure, a computer-readable storage medium in a network management system (NMS) that manages a communication system including a mobile telephone switching office (MTSO) coupled to a plurality of wireless base terminals (WBTs) by way of a corresponding plurality of network elements can have computer instructions for identifying for each of the plurality of WBTs a plurality of resultant communication paths to the MTSO determined from a plurality of communication path solutions between the WBTs and the MTSO that satisfy a desired differential delay threshold for each of a plurality of failure scenarios affecting the plurality of network elements.

In a third embodiment of the present disclosure, a network element that exchanges messages with a mobile telephone switching office (MTSO), can have an operating element that receives from a network management system (NMS) provisioning information associated with a resultant communication path selected from a plurality of resultant communication paths between the network element and the MTSO in response to a detected change in the plurality of network elements, wherein the plurality of resultant communication paths is determined by the NMS from a plurality of communication path solutions between the WBTs and the MTSO that satisfy a desired differential delay threshold for each of a plurality of change scenarios affecting the plurality of network elements.

Figure 1:
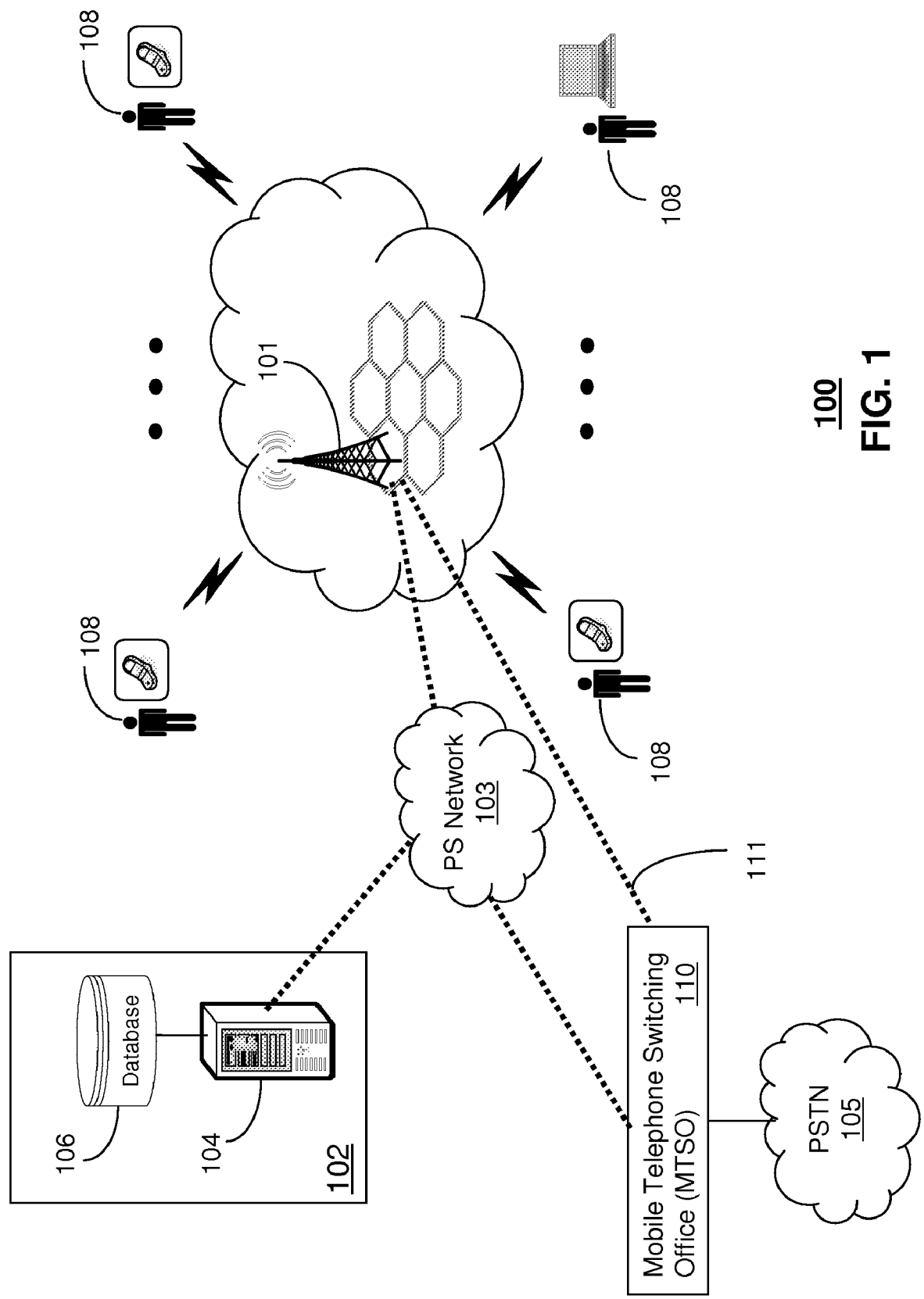
FIG. 1 depicts an exemplary embodiment of a communication system.

FIG. 1 depicts an exemplary embodiment of a communication system 100. The communication system 100 can comprise a plurality of wireless base terminals (WBTs) 101, also commonly referred to as base stations, distributed throughout a network under a frequency-reuse methodology to provide wireless services to roaming end users 108 over a large geographic region (such as a city, state or nation). The end users can use any wireless device capable of communicating with the WBTs 101 including without limitation mobile phones, cellular-capable PDAs, and computing devices such as laptops equipped with a cellular interface. Any current or next generation cellular communications technology can be applied to the WBTs 101 and end user devices 108 including without limitation GSM/GPRS, CDMA-1X, EVDO, UMTS, software defined radio (SDR), WiMAX, and/or ultra wide band (UWB).

The WBTs 101 can relay mobile origination calls initiated by an end user device 108 to a mobile telephone switching office (MTSO) 110 by way of a packet-switched (PS) network 103 conforming to for example the Internet Protocol or more sophisticated protocols such as multi-protocol label switching or MPLS. An MTSO 110 houses switches and computers to which all WBTs 101 in an area are connected for the purpose of eventual connection to the public switched telephone network (PSTN) 105. The MTSO 110 handles the connection, tracking, status and billing of all wireless call activity in an assigned area.

A network management system (NMS) 102 can be utilized for programming the PS network 103 so that a mobile origination call processed by more than one WBT 101 conforms to the operating characteristics of the MTSO 110. In particular the NMS 102 provisions network elements (such as routers) of the PS network 103 so that MTSO 110 requirements for differential delay, path delay and jitter is satisfied for combinations of WBTs 101 processing the same mobile origination call of a select wireless mobile device. To accomplish this, the NMS 102 can utilize a controller 104 and associated database 106 that stores network topology information of the communication system 100. The controller 104 utilizes common computing technology such as a scalable server to manage the operations of the network elements of the PS network 103 as will be described shortly.

Figure 2:
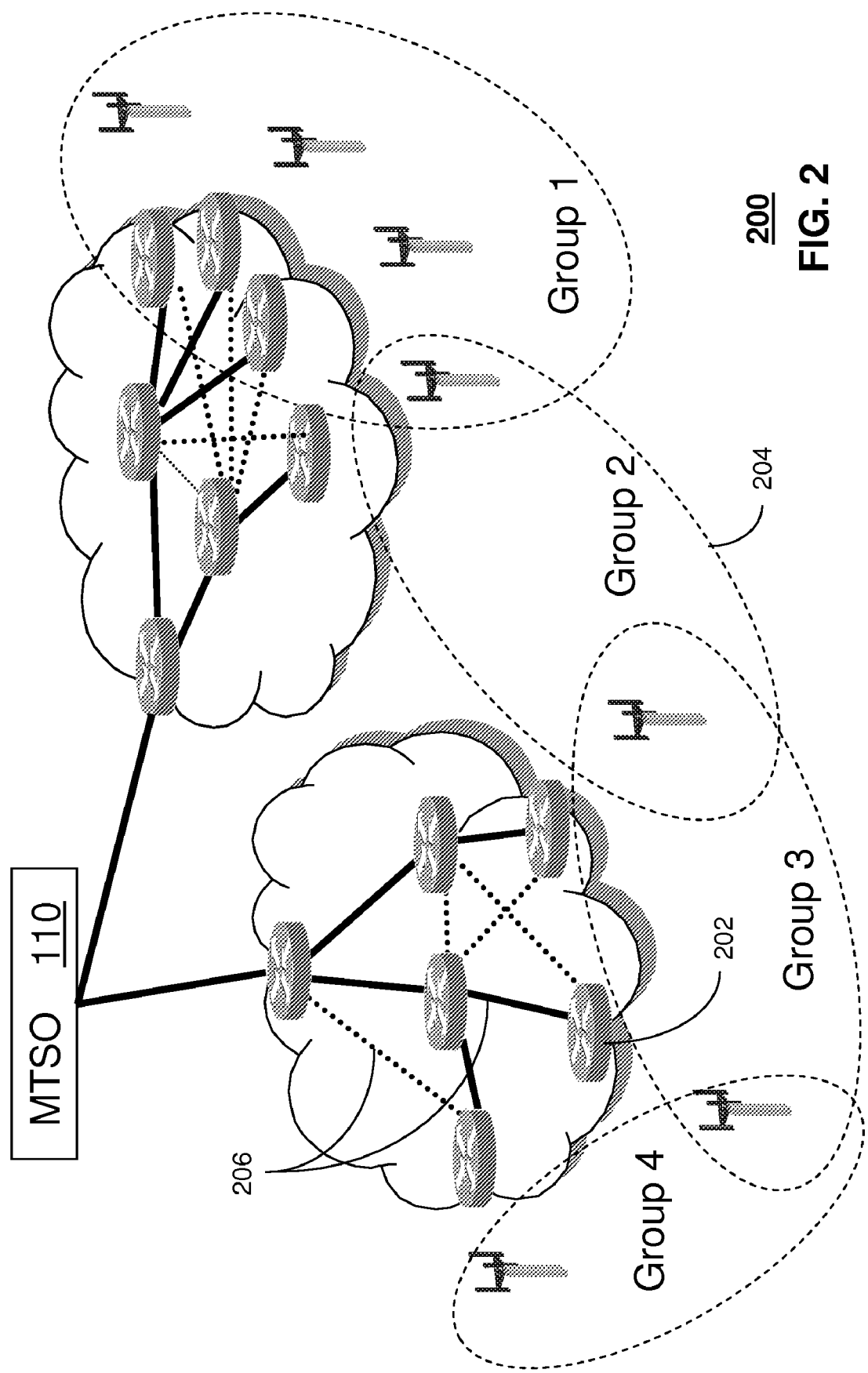
FIGS. 2-3 depict an exemplary method operating in the communication system.
Figure 3:
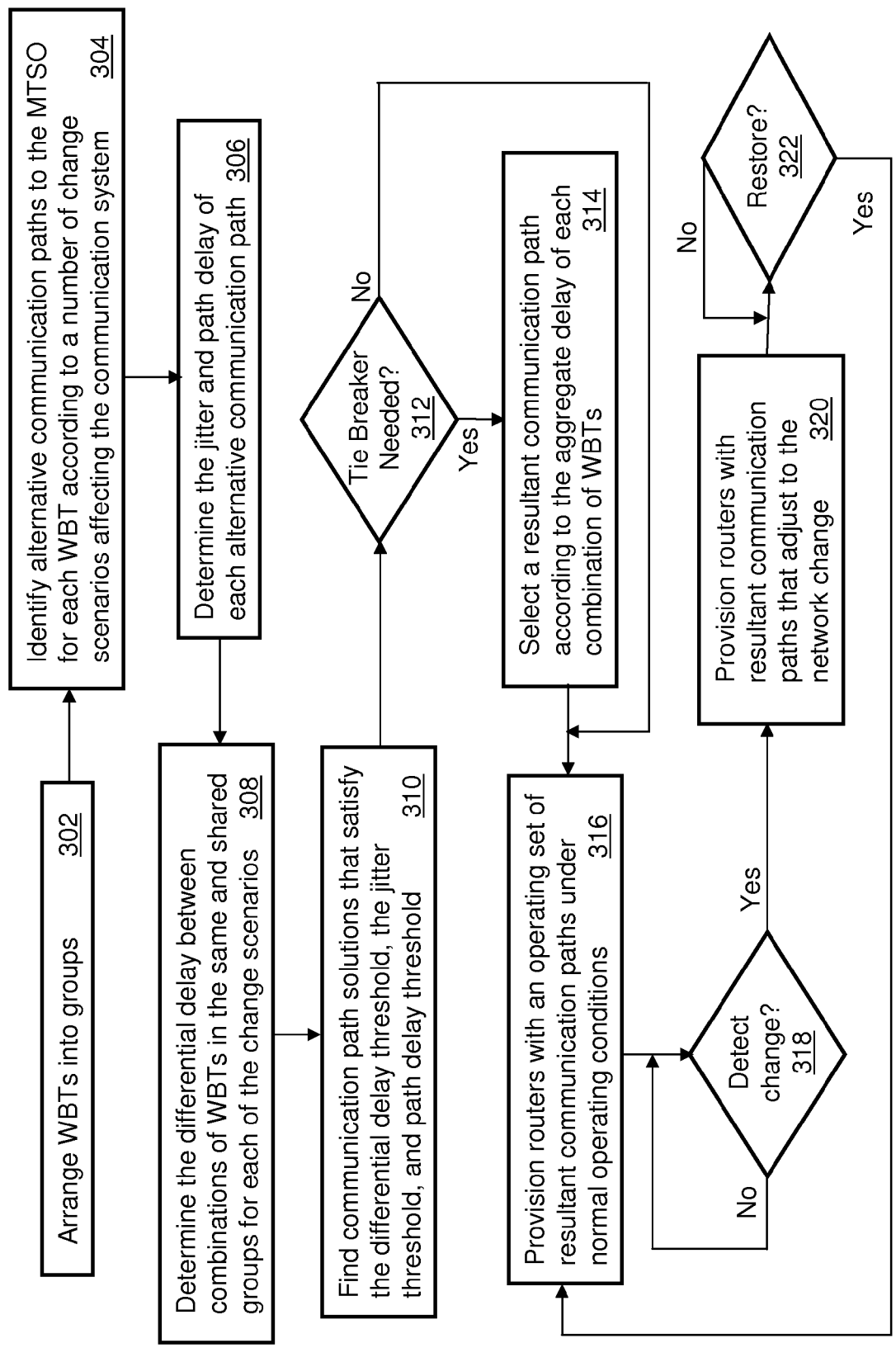

FIGS. 2-3 depict an exemplary method 300 operating in the communication system 100. FIG. 2 depicts a detailed view of the WBTs 101 coupled to the MTSO 110 by way of a number of network elements 202 (herein referred to as routers 202 for exemplary purposes only). The routers 202 at the edges of the PS network 103 are coupled to corresponding WBTs 101. Each WBT 101 is assigned to a single router 202. For purposes of the present illustration, the PS network 103 can be assumed to operate according to an MPLS protocol. Because of the dynamic nature of packet switching networks, there are many alternative communication paths 206 that can be chosen between a particular WBT 101 and the MTSO 110. The ad hoc nature of such networks can have an adverse effect on the MTSO 110 when combinations of WBTs 101 are serving the same mobile communication device 108. To be compliant with the MTSO 110 requirements for differential delay, path delay, and jitter, the NMS 102 can be programmed to provision the routers 202 according to method 300 as depicted in FIG. 3.

Method 300 can begin with step 302 in which the NMS 102 can be programmed to arrange the WBTs 101 into groups 204 such as depicted in FIG. 2 with overlapping coverage areas having one or more shared WBTs therebetween. In step 304, the NMS 102 can be programmed to identify alternative communication paths to the MTSO 110 for each WBT 101 according to a number of change scenarios associated with the routers 202. A change scenario can represent a modification to the PS network 103 or leased links 111. Similarly, a change scenario can represent a failure scenario in one or more network elements 202 or corresponding links 206 between elements. A failure scenario can represent for example a fault in one or more routers 202 which in turn interrupts in whole or in part packet traffic managed thereby. Alternatively, or in combination a failure scenario can consist of a break in a communication link (copper and/or fiber) caused by repair or replacement work performed by field maintenance crews of the communication system 100. There are numerous other common network failures that can be anticipated by the NMS 102. For illustration purposes only, the remaining steps of method 300 will be discussed in references to a failure scenario. These steps can of course be applied to network modifications as well.

Alternative communication paths can be determined for each of these failure scenarios according to a number of common path determination algorithms. For example, up to K alternative communication paths (K being an integer) can be determined from a shortest path algorithm such as presented in an article entitled, "Finding the K Shortest Loopless Paths in a Network," authored by J. Y. Yen, published July 1971 by Management Science, pp. 712-716 (herein referred to as "the Yen algorithm"), the contents of which are expressly incorporated herein in its entirety. In view of the Yen algorithm, the solid and dotted links 206 between routers 202 can represent a number of shortest loopless alternative communication paths to the MTSO 110 for each of the WBTs 101 solved thereby.

Once a number of alternative communication paths to the MTSO 110 have been identified for each WBT 101 under each failure scenario, the NMS 102 can be programmed to proceed to step 306 where it calculates expected distortions such as jitter and path delay for each alternative communication path. Jitter is the variation in delay between packets.

Knowing the path delays of each alternative communication path, the NMS 102 can proceed to step 308 where it determines the differential delay between combinations of WBTs 101 within a group and in shared groups 204 for each of the failure scenarios. In the illustration of FIG. 2, each group has a shared WBT 101. Accordingly differential delays are calculated between WBTs 101 of group 4 according to combinations of alternative communication paths associated with these WBTs 101 for each failure scenario. The same calculations are applied to groups 3, 2 and 1. The differential delays are determined by calculating the difference between path delays in alternative communication paths of combinations of WBTs 101 serving the same mobile communication device 108. The alternative communication paths can be packet switched paths by way of the PS network 103 and/or dedicated leased lines 111.

In step 310, the NMS 102 can be programmed with common linear equation techniques to find communication path solutions between the MTSO 110 and each WBT 101 that satisfy a differential delay threshold (e.g., less than or equal to 15 ms), a jitter threshold, and path delay threshold (e.g., less than or equal to 25 ms) for each of a number failure scenarios predicted by the NMS 102. In situations in which WBTs 101 have more than one communication path solution to the MTSO 110 for each failure scenario that satisfy the criteria of step 310, the NMS 102 can be programmed according to steps 312-314 which applies a tie-breaker algorithm.

In step 314, the NMS 102 can be programmed to select a resultant communication path for each WBT 101 under each network failure scenario from a select one of the communication path solutions having a lowest aggregate delay summed over the combinations of WBTs 101. If on the other hand, a single solution is found for all of the WBTs 101 of FIG. 2 under each failure scenario, then the NMS 102 can proceed from step 312 to step 316 where it provisions the routers 202 according to an operating set of resultant communication paths for the WBTs 101 under normal operating conditions. The operating set of resultant communication paths can be determined according to the foregoing steps of method 300 which assume no network faults.

Provisioning step 316 can represent for example the organization of virtual private network (VPN) links between the routers 202 in order to establish the resultant communication path for each WBT 101 to the MTSO 110. Step 316 is depicted by the solid lines between each router 202 serving a WBT 101 at the edge of the PS network 103. In step 318, the NMS 102 can be programmed to detect failures in the PS network 103. As noted earlier, the failure can be a fault detected in a router 202 and/or communication links between intermediate routers 202 connecting the WBTs 101 to the MTSO 110.

If no network failure is detected in step 318, the NMS 102 continues operating under the provisioning conditions set forth in step 316. Once a failure is detected, the NMS 102 proceeds to step 320 where it provisions a portion of the routers 202 with a response set of resultant communication paths selected from the resultant communication path mappings created by steps 302-314. Step 320 thus can represent a process in which a failure (or change) scenario is mapped to a corresponding set of resultant communication paths that adjust to the network failure (or change). Once network operations are restored by step 320, the NMS 102 proceeds to step 322 where it checks for a recovery from the network failure (or change). If a recovery is not detected, the NMS 102 continues to operate as set forth in step 320. Otherwise, the NMS 102 proceeds to step 316 and restores the resultant communication paths to their normal operating condition and continues to check for additional failures (or network changes) in step 318.

Method 300 provides a means to rapidly restore operating conditions when a network failure is detected. By proactively solving for likely network failures or anticipated failures from planned maintenance operations, the NMS 102 can rapidly respond to such failures by selecting a mapped solution of resultant communication paths for each failure as it occurs.

In an exemplary embodiment, the following linear equations can be applied to method 300 to solve for resultant communication paths for predictable failure (or change) scenarios as well as the case in which the PS network 103 is operating without fault. The following linear equations also take into account more than one path between the WBTs 101 and corresponding edge routers 202.

$p_x^k$: 0 if the $k^{th}$ ($1 \leq k \leq K$) alternative communication path for WBTx is not selected, where WBTx belongs to all the WBTs 101 in a group 204.

$p_x^k$: 1 if the $k^{th}$ ($1 \leq k \leq K$) alternative communication path for WBTx is selected.

$d_x^k$ is the path delay of the $k^{th}$ ($1 \leq k \leq K$) alternative communication path for WBTx.

$j_x^k$ is the worst case jitter of the $k^{th}$ ($1 \leq k \leq K$) alternative communication path for WBTx.

$t_x^{k,l}$: 1 if the $k^{th}$ ($1 \leq k \leq K$) path for WBTx traverses link l; 0 otherwise (note $t_x^{k,l}$ is given, not calculated by the formula below).

T: an integer temp variable.

The objective is to minimize the aggregate delay among the solutions of communication paths to the MTSO 110

$$W \times \left( \sum_x \sum_k p_x^k \times d_x^k \right) + T,$$

where W is a weighting factor, which the foregoing equation is subject to:

$p_{x_1}^{k_1} \times d_{x_1}^{k_1} - p_{x_2}^{k_2} \times d_{x_2}^{k_2} \leq A$, $k_1 \geq 1$, $k_2 \leq K$, $x_1 \neq x_2$ for WBTs 101 belonging to the same groups 204, wherein A is the differential delay threshold;

$p_x^k \times d_x^k \leq B$, wherein B is the path delay threshold;

$p_x^k \times j_x^k \leq C$, wherein C is the distortion threshold (e.g., jitter tolerance threshold);

$$\sum_k p_x^k = 1$$

only one resultant communication path can be selected for each WBT 101; and $$\sum_x \sum_k p_x^k \times t_x^{k,l} \leq T,$$

for each link l.

It should be evident from the above formulations that shared WBTs 101 create dependencies between shared groups 206 for calculating resultant communication paths. Thus in the illustration of FIG. 2, groups 1-4 require a holistic approach to determining resultant communication paths for the WBTs 101 in said groups for a number of expected network failure scenarios.

There are many algorithms other than those described above that can be used to solve for resultant communication paths between the MTSO 110 and WBTs 101 that satisfy the operational criteria set forth by the MTSO 110 under normal operating conditions as well as when a network fault is detected. It would be evident therefore to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

Figure 4:
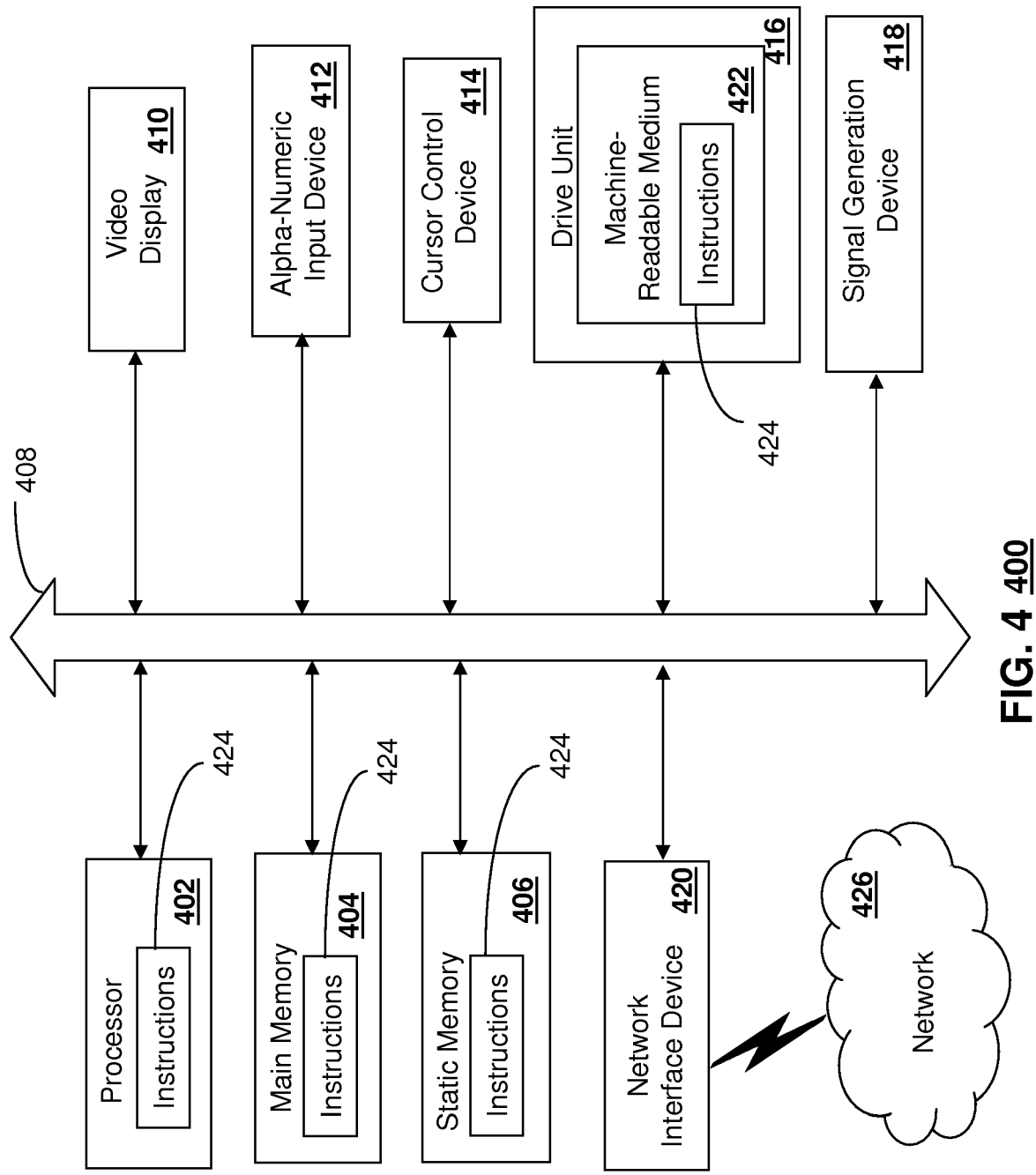
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system (NMS) that manages operations of a communication system including a mobile telephone switching office (MTSO) coupled to a plurality of wireless base terminals (WBTs) by way of a corresponding plurality of network elements, comprising a network configuration element that identifies for each of the plurality of WBTs a plurality of resultant communication paths to the MTSO according to a plurality of differential delays calculated from alternative communication paths connecting combinations of the WBTs to the MTSO for each of a plurality of change scenarios affecting the plurality of network elements, wherein a change scenario comprises a change to a topology associated with the plurality of network elements.

2. The NMS of claim 1, wherein network configuration element identifies for each of the WBTs a corresponding one or more alternative communication paths to the MTSO for each of the plurality of change scenarios according to distances between the WBTs and the MTSO.

3. A network management system (NMS) that manages operations of a communication system including a mobile telephone switching office (MTSO) coupled to a plurality of wireless base terminals (WBTs) by way of a corresponding plurality of network elements, comprising a network configuration element that identifies for each of the plurality of WBTs a plurality of resultant communication paths to the MTSO according to a plurality of differential delays calculated from alternative communication paths connecting combinations of the WBTs to the MTSO for each of a plurality of change scenarios affecting the plurality of network elements, wherein the network configuration element arranges portions of the plurality of WBTs into a corresponding plurality of groups, and selects for each WBT in a select one of the plurality of groups (the selected group) its corresponding plurality of resultant communication paths to the MTSO according to differential delays calculated for alternative communication paths associated with combinations of WBTs in the selected group and the plurality of change scenarios affecting the selected group.

4. The NMS of claim 1, wherein the network configuration element arranges portions of the plurality of WBTs into a corresponding plurality of groups, wherein first and second groups in the plurality of groups shares at least one WBT, and selects for the at least one WBT shared by the first and second groups its corresponding plurality of resultant communication paths to the MTSO according to differential delays calculated for alternative communication paths associated with combinations of WBTs in the first and second groups and the plurality of change scenarios affecting said first and second groups.

5. The NMS of claim 1, wherein the plurality of differential delays are below a threshold.

6. The NMS of claim 1, wherein the network configuration element arranges portions of the plurality of WBTs into a corresponding plurality of groups, and identifies for each WBT in a select one of the plurality of groups (the selected group) one or more communication paths to the MTSO according to differential delays, path delays, and distortions calculated for alternative communication paths to the MTSO associated with combinations of WBTs in the selected group and the plurality of change scenarios affecting the selected group.

7. The NMS of claim 6, wherein the differential delays, path delays, and distortions are below first, second, and third thresholds, respectively.

8. The NMS of claim 6, wherein the network configuration element selects the plurality of resultant communication paths to the MTSO for each WBT in the selected group according to an aggregate delay calculated for the identified communication paths to the MTSO for each combination of WBTs in the selected group and the plurality of change scenarios affecting the selected group.

9. The NMS of claim 8, wherein the network configuration element selects each of the plurality of resultant communication paths for each combination of WBTs in the selected group according to a lowest of the aggregate delays calculated.

10. The NMS of claim 6, wherein the distortions comprise jitter calculated by the network configuration element for each of the alternative communication paths to the MTSO for each of the plurality of change scenarios affecting the selected group.

11. The NMS of claim 6, wherein the network configuration element provisions the plurality of network elements with an operating set of resultant communication paths for the WBTs to exchange messages with the MTSO under normal operating conditions, detects a network change in the plurality of network elements, selects from the plurality of resultant communication paths a response set of resultant communication paths for correcting the network change detected, and provisions a portion of the plurality of network elements with the response set of resultant communication paths for the WBTs to exchange messages with the MTSO.

12. The NMS of claim 11, wherein a change scenario corresponds to a failure scenario in the plurality of network elements, and wherein the network configuration element detects a recovery from the network failure, and provisions the portion of the plurality of network elements with the operating set of resultant communication paths thereby restoring normal operating conditions.

13. A computer-readable storage medium in a network management system (NMS) that manages a communication system including a mobile telephone switching office (MTSO) coupled to a plurality of wireless base terminals (WBTs) by way of a corresponding plurality of network elements, comprising computer instructions for identifying for each of the plurality of WBTs a plurality of resultant communication paths to the MTSO determined from a plurality of communication path solutions between the WBTs and the MTSO that satisfy a desired differential delay threshold for each of a plurality of failure scenarios affecting the plurality of network elements, arranging portions of the plurality of WBTs into a corresponding plurality of groups, and selecting for each WBT in a select one of the plurality of groups (the selected group) its corresponding plurality of resultant communication paths to the MTSO according to differential delays calculated for alternative communication paths associated with combinations of WBTs in the selected group for each of the plurality of failure scenarios affecting the selected group.

14. The storage medium of claim 13, comprising computer instructions for:
arranging portions of the plurality of WBTs into a corresponding plurality of groups, wherein first and second groups in the plurality of groups shares at least one WBT; and
selecting for the at least one WBT shared by the first and second groups its corresponding plurality of resultant communication paths to the MTSO according to differential delays calculated for alternative communication paths associated with combinations of WBTs in the first and second groups and the plurality of failure scenarios affecting said first and second groups.

15. The storage medium of claim 13, comprising computer instructions for:
arranging portions of the plurality of WBTs into a corresponding plurality of groups; and
identifying for each WBT in a select one of the plurality of groups (the selected group) a plurality of communication paths to the MTSO according to differential delays, path delays, and distortions calculated for alternative communication paths to the MTSO associated with combinations of WBTs in the selected group and the plurality of failure scenarios affecting the selected group, wherein the differential delays, path delays, and distortions fall below the differential delay threshold, a path delay threshold, and a distortion threshold, respectively.

16. The storage medium of claim 15, comprising computer instructions for selecting the plurality of resultant communication paths to the MTSO for each WBT in the selected group according to a lowest of an aggregate delay calculated for the identified communication paths to the MTSO for each combination of WBTs in the selected group and the plurality of failure scenarios affecting the selected group.

17. The storage medium of claim 15, comprising computer instructions for:
provisioning the plurality of network elements with an operating set of resultant communication paths for the WBTs to exchange messages with the MTSO under normal operating conditions; detecting a network failure in the plurality of network elements;
selecting from the plurality of resultant communication paths a response set of resultant communication paths for correcting the network failure detected; provisioning a portion of the plurality of network elements with the response set of resultant communication paths for the WBTs to exchange messages with the MTSO;
detecting a recovery from the network failure; and
provisioning the plurality of network elements with the operating set of resultant communication paths thereby restoring normal operating conditions.

18. A network element that exchanges messages with a mobile telephone switching office (MTSO), comprising an operating element that receives from a network management system (NMS) provisioning information associated with a resultant communication path selected from a plurality of resultant communication paths between the network element and the MTSO in response to a detected change in the plurality of network elements, wherein the plurality of resultant communication paths is determined by the NMS from a plurality of communication path solutions between a plurality of wireless base terminals (WBTs) and the MTSO that satisfy a desired differential delay threshold for each of a plurality of change scenarios affecting the plurality of network elements, wherein portions of the plurality of WBTs are arranged by the NMS into a corresponding plurality of groups, and wherein for each WBT in a select one of the plurality of groups (the selected groups) its corresponding plurality of resultant communication paths to the MTSO are selected by the NMS according to differential delays calculated for alternative communication paths associated with combinations of WBTs in the selected group and the plurality of change scenarios affecting the selected group.

19. The network of claim 18, wherein the operating element comprises one among a router and a switch for transmitting messages to the MTSO according to a packet protocol.

* * * * *